(12) United States Patent
McLoughlin et al.

(10) Patent No.: US 12,511,352 B2
(45) Date of Patent: Dec. 30, 2025

(54) SHEET MUSIC DISTRIBUTION SYSTEM

(71) Applicant: J.W. Pepper & Son, Inc., Exton, PA (US)

(72) Inventors: Ian McLoughlin, Glenmoore, PA (US); Jacob Walls, Philadelphia, PA (US); David DiMarino, Chester Spring, PA (US); Kathleen Fernandes, Downingtown, PA (US); Christopher Fowler, Downingtown, PA (US); Dawn Fenstermacher, Unionville, PA (US); Robert Scott Grady, Phoenixville, PA (US)

(73) Assignee: J.W. Pepper & Son, Inc., Exton, PA (US)

( * ) Notice: Subject to any disclaimer, the term of this patent is extended or adjusted under 35 U.S.C. 154(b) by 484 days.

(21) Appl. No.: 17/524,857

(22) Filed: Nov. 12, 2021

(65) Prior Publication Data

US 2022/0156347 A1    May 19, 2022

Related U.S. Application Data

(60) Provisional application No. 63/113,223, filed on Nov. 13, 2020.

(51) Int. Cl.
*G06F 21/00* (2013.01)
*G06F 3/0482* (2013.01)
*G06F 16/93* (2019.01)
*G06F 21/10* (2013.01)
*G06Q 50/18* (2012.01)

(52) U.S. Cl.
CPC .......... *G06F 21/105* (2013.01); *G06F 3/0482* (2013.01); *G06F 16/93* (2019.01); *G06Q 50/184* (2013.01); *G06F 21/1012* (2023.08); *G06F 21/1015* (2023.08); *G06Q 2220/10* (2013.01)

(58) Field of Classification Search
None
See application file for complete search history.

(56) References Cited

U.S. PATENT DOCUMENTS

| | | | |
|---|---|---|---|
| 8,552,281 B1* | 10/2013 | Cotrone | G09B 15/02 84/477 R |
| 9,147,352 B1* | 9/2015 | Cotrone | G09B 15/023 |
| 2008/0056491 A1* | 3/2008 | Craig | H04L 9/083 707/999.005 |

(Continued)

*Primary Examiner* — Farhan M Syed
(74) *Attorney, Agent, or Firm* — Blank Rome LLP

(57) ABSTRACT

A system that enables digital distribution of copyrighted sheet music—and allows musician to view the copyrighted sheet music on personal computing devices—while preventing the unauthorized distribution of copyrighted sheet music. An electronic commerce platform provides functionality to purchase copies of copyrighted sheet music. A network security module provides login credentials for purchasers and musicians (and, in some embodiments, limits the number of simultaneous logins). A graphical user interface provides functionality for each purchaser to distribute each purchased copy to one—and only one—musician. In some embodiments, the system allows purchasers to recall sheet music distributed to a first musician and distribute the recalled sheet music to a second musician (without providing functionality for the first musician to view the recalled sheet music).

17 Claims, 10 Drawing Sheets

(56) References Cited

U.S. PATENT DOCUMENTS

| | | | |
|---|---|---|---|
| 2010/0326256 A1* | 12/2010 | Emmerson | G10H 1/0025 84/610 |
| 2011/0203442 A1* | 8/2011 | Raveendran | G10G 1/00 84/483.1 |
| 2015/0059558 A1* | 3/2015 | Morell | G10H 1/0025 84/609 |
| 2020/0051534 A1* | 2/2020 | Bradley | G10H 1/40 |
| 2020/0227012 A1* | 7/2020 | Goren | G10H 1/0008 |
| 2022/0043854 A1* | 2/2022 | Sawruk | G06F 16/9538 |

* cited by examiner

SHEET MUSIC DISTRIBUTION SYSTEM

CROSS-REFERENCE TO RELATED APPLICATIONS

This application claims priority to U.S. Prov. Pat. Appl. No. 63/113,223, filed Nov. 13, 2020, which is hereby incorporated by reference.

BACKGROUND

The sheet music that musicians read from when practicing individually, rehearsing as a group, or performing at an event is predominantly retailed to the director or librarian of the musical ensemble, such as a secondary school band or choir teacher, church music director, or leading member of a chamber ensemble, who then distributes copies of the music to the members of that ensemble. The distributed sheet music might be the score, which contains the parts of all performers, or it may be an individual part containing just the music that one musician performs. The appropriate score or part to distribute depends on the ensemble and the role of the musician in that ensemble. For example, a pianist in an orchestra would typically read from a piano part, whereas a rehearsal pianist for a chorus would typically read from a score. Likewise, an assistant conductor of a collegiate wind ensemble would need a copy of the score for the purposes of score study, but that individual might also be assigned other performing parts so that they might cover absences during rehearsals.

For musical repertoire under copyright, directors must purchase enough copies of the scores or parts of each composition for each musician to be lent a legal copy. With printed sheet music, directors would typically build a library of purchased music, lend parts and scores to ensemble members as needed, and collect them after the composition has been performed. Publishers cater to ensemble directors by selling sheet music in sets that anticipate a typical distribution of scores and parts. For example, for one price, a composition may be sold as a collection of scores and parts that includes one copy of the score, eight copies of the first flute part, eight copies of the second flute part, four copies of the oboe part, six copies of the first clarinet part, etc. Individual parts and scores can then be ordered separately to accommodate additional musicians or to replace copies lost over time.

As the retailing of sheet music in digital form developed, it has hewed so closely to these concepts that much of the transaction remains the same. Publishers still set prices for collections of scores and parts that represent a typical distribution as well as prices for ad hoc additional parts. For compositions without parts, such as choral music, some copyright owners deter directors from buying a single copy and then making reproductions by requiring that a minimum number of digital copies (e.g., five) be purchased. In both cases, retailers continue to sell to ensemble directors, who then retain ownership of the digital materials.

In addition, no method of digitally distributing and recalling individual copies of scores and parts from a director's library to and from ensemble members has emerged. With the ability to purchase sheet music in digital form, there is a desire amongst directors to distribute that digital sheet music digitally. At the same time, there is a desire amongst musicians to receive that digital sheet music digitally and view it on a personal computing device (e.g., tablet computer). To do so using existing technology, directors will typically print and scan purchased sheet music and share the scanned copies, for example using email or file sharing services. That method is a both cumbersome process for the owner of the digital sheet music and does not protect the copyright of the digital sheet music because it allows (and even requires) that unauthorized copies be made.

Accordingly, there is a need for a system that enables digital distribution of digital sheet music, viewing of the shared digital sheet music on a personal computing device, and copyright protection of the shared digital sheet music.

BACKGROUND

In order to overcome those and other drawbacks in the prior art, a system for distributing copyrighted sheet music via computer networks is provided. The system allows purchasers to distribute digital copies of copyrighted sheet music to musicians in ensembles, allows those musicians to view the copyrighted sheet music shared with them on personal computing devices, and prevents the unauthorized distribution of the copyrighted sheet music.

The system includes an electronic commerce platform that provides functionality to purchase copies of copyrighted sheet music (e.g., scores and/or parts of copyrighted compositions), a network security module provides login credentials for purchasers and musicians, and a graphical user interface provides functionality for purchasers to distribute each purchased copy of copyrighted sheet music to one musician (without providing functionality to distribute the same copy of copyrighted sheet music to more than one musician).

In some embodiments, the network security module limits the number of simultaneous logins by each musician.

In some embodiments, the graphical user interface provides functionality for purchasers to recall a copy of copyrighted sheet music distributed to a first musician and distribute the recalled copy to a second musician (without providing functionality for the first musician to view the recalled copy of the copyrighted sheet music).

In some embodiments, the graphical user interface provides functionality for purchasers to create musician folders (e.g., a musician folder for each musician in an ensemble or each role in the ensemble). In those embodiments, the graphical user interface provides functionality for the purchasers to distribute each copy of the copyrighted sheet music by adding each copy of the copyrighted sheet music to one of the musician folders. In some of those embodiments, the network security module limits the number of remote computing devices that can simultaneously access each of the musician folders. In some embodiments, the graphical user interface provides functionality for purchasers to create ensemble folders for ensembles, the ensemble folder including musician folders for each musician in the ensemble or role in the ensemble.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments.

DETAILED DESCRIPTION

Figure 1:
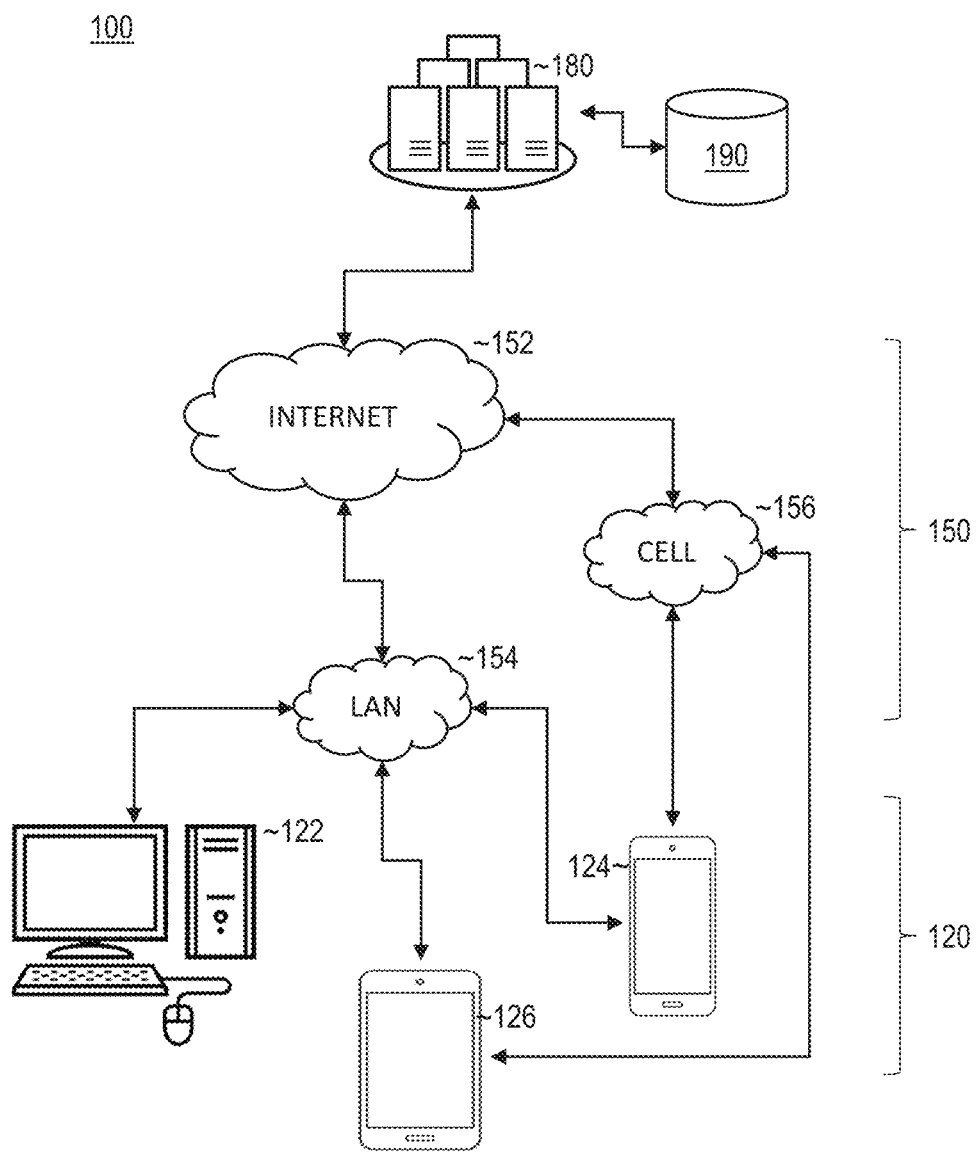
FIG. 1 is a diagram of an architecture of a sheet music distribution system according to an exemplary embodiment.

Reference to the drawings illustrating various views of exemplary embodiments is now made. In the drawings and the description of the drawings herein, certain terminology is used for convenience only and is not to be taken as limiting the embodiments of the present invention. Furthermore, in the drawings and the description below, like numerals indicate like elements throughout.

FIG. 1 is a diagram of an architecture 100 of a sheet music distribution system 200 according to an exemplary embodiment.

As shown in FIG. 1, the architecture 100 includes one or more servers 180, non-transitory computer readable storage media 190, and one or more remote computing devices 120 that are electrically connected to the one or more servers 180 via one or more networks 150. The networks 150 may include a wide area network 152 such as the Internet, local area networks 154, cellular networks 156, etc.

The computer readable storage media 190 may include any hardware storage medium, such as a hard disk, solid-state memory, etc. The one or more servers 180 may include any suitable computing device that executes instructions to perform the functions described herein. The server(s) 180 may include, for example, a web server that provides a user interface that is accessible by the remote computing devices 120 using a web browser. Additionally or alternatively, the server(s) 180 may include an application server that makes software executed by the server(s) 180 accessible to a software program executed by the remote computing devices 120. The application server may be a mobile application server that makes software executed by the server(s) 180 accessible to a mobile application running executed by the remote computing devices 120.

The remote computing devices 120 may include any suitable computing device that executes instructions to send and receive data to/from the one or more servers 180 and provides a graphical user interface to receive instructions from a user and display information to that user. The remote computing devices 120 may include (desktop or notebook) personal computers 122, smartphones 124, and tablet computers 126.

Both the server(s) 180 and the remote computing devices 120 each include internal non-transitory storage media that stores computer-readable instructions and at least one hardware computer processor that performs the functions described herein by reading and executing those instructions. The server(s) 180, the storage media 190, and the remote computing devices 120 may be co-located or remotely located from each other. The network(s) 150 may include one or more short- or long-range data connections that enable the server(s) 180 to receive instructions from the remote computing devices 120 and to output information to the remote computing devices 120. The network(s) 150 may include wired and/or wireless data connections.

Figure 2:
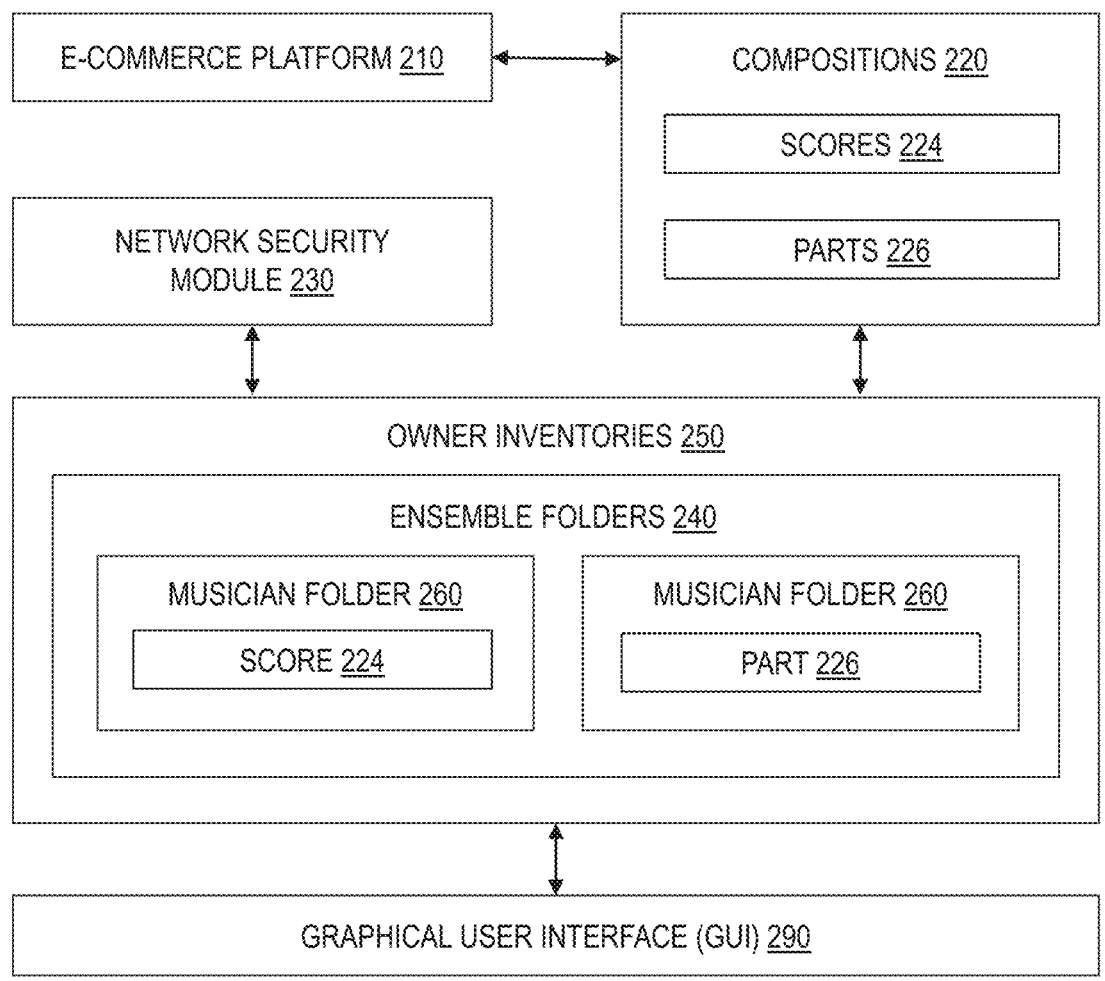
FIG. 2 is a block diagram of the sheet music distribution system according to an exemplary embodiment.

FIG. 2 is a block diagram of the sheet music distribution system 200 according to an exemplary embodiment.

As shown in FIG. 2, the sheet music distribution system 200 includes an e-commerce platform 210, a database of compositions 220, a network security module 230, and at least one graphical user interface 290.

A composition 220 may include a score 224, which contains musical notations for everyone in an ensemble performing the composition 220, and/or any number of parts 226, which contains musical notations for one musician in the ensemble performing the composition 220 (or all musicians having the same role in that ensemble). As used herein, "sheet music" may refer to a score 224 or a part 226. Similarly, "copyrighted sheet music" may refer to a copyrighted score 224, a copyrighted part 226, or a score 224 or part 226 of a copyrighted composition 220.

As described in detail below, the sheet music distribution system 200 enables users to add compositions 220 to each user's owner inventory 250, for example by purchasing compositions 220 via the e-commerce platform 210. The sheet music distribution system 200 also provides functionality to create ensemble folders 240 for each ensemble, create musician folders 260 for each musician in each ensemble, and distribute scores 224 and parts 226 to each musician.

The e-commerce platform 210 may be any online platform to purchase digital sheet music. The e-commerce platform 210 may be, for example, an online e-commerce platform such as the one provided by J.W. Pepper & Son, Inc.

The compositions 220 may be any collection of digital sheet music available for purchase via the e-commerce platform 210. The compositions 220 and the owner inventories 250 may be stored, for example, in the storage media 190. The compositions 220 may be, for example, digital sheet music such as the sheet music available from J.W. Pepper & Son, Inc.

The network security module 230 provides and maintains secure login credentials to access each owner inventory 250 and each musician folder 260. The network security module 230 also prevents users of the sheet music distribution system 200 from accessing any owner inventory 250 or musician folder 260 without the login credentials for that owner inventory 250 or musician folder 260. To protect the copyrights of the compositions 220, the network security module 230 may limit the number of simultaneous logins to each owner inventory 250 and each musician folder 260.

The graphical user interface 290 may be any interface that receives instructions from users of the sheet music distribution system 200 (via the remote computing devices 120) and displays information to users of the sheet music distribution system 200 (via the remote computing devices 120).

The e-commerce platform 210, the network security module 230, and the graphical user interface 290 may be realized as software instructions (e.g., a web application) stored and executed by the one or more servers 180 and available to the remote computing devices (e.g., via a web browser). Additionally or alternatively, the e-commerce platform 210 and the graphical user interface 290 may be realized as software instructions (e.g., a software application or mobile application) downloaded to and stored and executed by the remote computing devices 120 in communication with the one or more servers 180 (e.g., via an application server or mobile application server).

As shown and described below, the sheet music distribution system 200 enables the owner of scores 224 and/or parts 226 of compositions 220 to distribute those scores 224 and/or parts 226 by creating ensemble folders 240 for ensembles, creating musician folders 260 for musicians in those ensembles, and assigning scores 224 or parts 226 to each musician folder 260. The ensemble folders 240 may be labeled to identify the ensemble. The musician folders 260 may be labeled to identify the musician or the musician's role (e.g., "Trumpet 1"). In some embodiments, the sheet music distribution system 200 may provide functionality for the same musician folder 260 to be included in multiple ensemble folders 240 to accommodate musicians that are in multiple ensembles that receive compositions 220 from the same owner inventory 250.

The sheet music distribution system 200 displays the owner inventory 250 such that the owner can determine the scores 224, parts 226, and compositions 220 that are available to distribute and the scores 224 and parts 226 that have already been distributed. The owner of a composition 220 may then determine if additional scores 224 or parts 226 of a composition 220 are required for an ensemble to perform the composition 220. The sheet music distribution system 200 also provides functionality to purchase additional scores 224 and parts 226 via the e-commerce platform 210, add those purchased scores 224 and parts 226 to the owner inventory 250, and distribute those purchased scores 224 and parts 226 to the musician folders 260 as needed.

The network security module 230 generates secure login credentials for each musician folder 260 and the sheet music distribution system 200 provides functionality for the musician with those credentials to view the scores 224 and parts 226 shared with the musician.

The sheet music distribution system 200 also provides functionality for the owner of compositions 220 to view the owner inventory 250 sorted according to the ensemble folders 240 containing any assigned scores 224 or parts 226 of that composition 220. The sheet music distribution system 200 may also provide functionality for the owner of compositions 220 to view the owner inventory 250 sorted according to the musician folders 260 containing any assigned scores 224 or parts 226 of that composition 220.

The sheet music distribution system 200 may also provide functionality to recall a selected score 224 or part 226 from a selected musician folder 260, recall all scores 224 and parts 226 from a selected musician folder 260, recall all scores 224 and parts 226 from a selected ensemble folder 240, recall all scores 224 and parts 226 of a selected composition 220 from a selected ensemble folder 240, recall all scores 224 and parts 226 of a selected composition 220 from all ensemble folders 240, etc.

Figure 3:
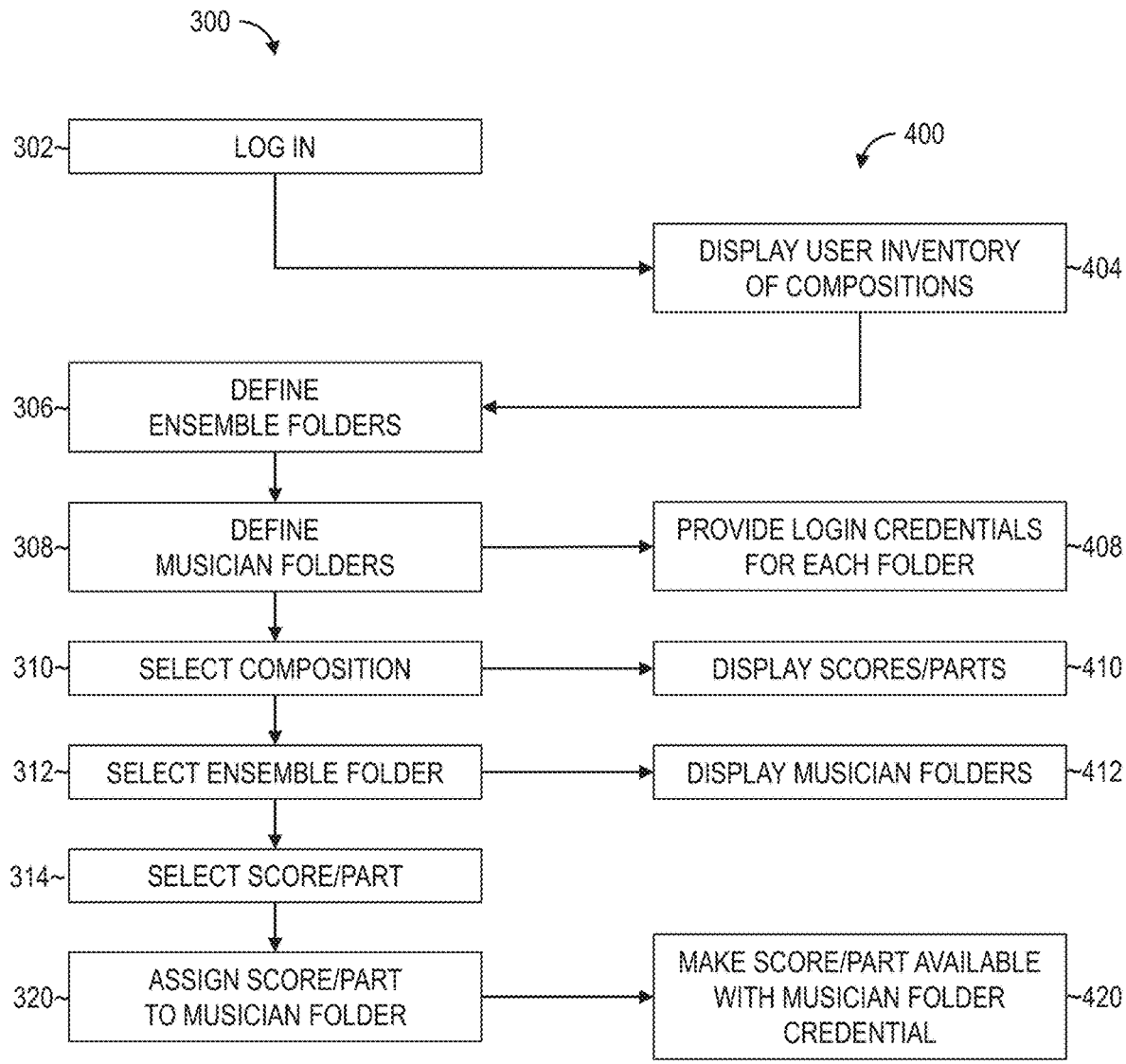
FIG. 3 is a flowchart of a sheet music assignment process performed by a user of the sheet music distribution system and a sheet music distribution process performed by the sheet music distribution system according to an exemplary embodiment.

FIG. 3 is a flowchart of a sheet music assignment process 300 performed by a user of the sheet music distribution system 200 and a sheet music distribution process 400 performed by the sheet music distribution system 200 according to an exemplary embodiment. As described above, the functions described as part of the sheet music distribution process 400 may be performed by the one or more servers 180 (e.g., by a web application accessible via a web browser) and/or the remote computing device 120 of the user (e.g., by a software application or mobile application). As one of ordinary skill in the art would recognize, in some instances the processing steps shown in FIG. 3 do not necessarily need to be performed in the order shown in FIG. 3.

A user logs into the sheet music distribution system 200 in step 302.

The sheet music distribution system 200 displays the user inventory 250, which includes the compositions 220 purchased by the user, via the graphical user interface 290 of the remote computing device 120 in step 404.

The user defines ensemble folders 240 for ensembles in step 306.

The user defines musician folders 260 in step 308.

The sheet music distribution system 200, for example the network security module 230, generates login credentials for each musician folder 260 in step 408. As discussed below, the login credentials for each musician folder 260 may be displayed for the owner of the composition 220 that created the musician folder 260, so the owner of the composition 220 can tell the musician the login credentials necessary to access the musician folder 260. Alternatively, the sheet music distribution system 200 may provide functionality for the owner of the composition 220 to specify contact information for the identified musician (e.g., an email address) and send the generated login credentials directly to identified musician.

The user selects a composition 220 from the owner inventory 250 in step 310.

The sheet music distribution system 200 displays the scores 224 and parts 226 included in the selected composition 220 that have yet to be assigned to a musician folder 260 (and are therefore still available to be distributed) in step 410. The sheet music distribution system 200 may also indicate which scores 224 and parts 226 have already been assigned to musician folders 260, so the owner of the composition 220 can determine which assignments are still required and/or if additional scores 224 or parts 226 need to be purchased.

The user selects an ensemble folder 240 in step 312.

The sheet music distribution system 200 displays the musician folders 260 included in the ensemble folder 240 in step 412. The sheet music distribution system 200 may also display the scores 224 and parts 226 from the selected composition 220 that have already been assigned to those musician folders 260.

The user selects a score 224 or part 226 of the selected composition 220 (that has yet to be assigned to a musician folder 260 and is therefore still available to be distributed) in step 314.

The user assigns the selected score 224 or part 226 to one of the musician folders 260 in step 320.

The sheet music distribution system 200 moves the selected score 224 or part 226 to the selected musician folder 260 in step 420. In doing so, the sheet music distribution system 200 makes the selected score 224 or part 226 available to the musician with the login credentials for the musician folder 260. The sheet music distribution system 200 also reduces the number of scores 224 and parts 226 that have yet to be assigned to a musician folder 260 (displayed to the user in step 410).

The sheet music distribution system 200 prevents the owner of the composition 220 from assigning the assigned score 224 or part 226 to another musician folder 260 (unless the owner of the composition 220 first recalls the assigned score 224 or part 226 as described below). In doing so, the sheet music distribution system 200 prevents the owner of the composition 220 from distributing more copies of the copyrighted scores 224 and/or parts 226 than the owner of the composition 220 has purchased and is legally entitled to distribute.

In addition to the sheet music assignment process 300, the sheet music distribution system 200 may also provide additional functionality. For example, if a composition 220 includes only scores 224 (and no parts 226), the sheet music distribution system 200 may provide functionality to assign one score 224 to each musician folder 260 in an ensemble folder 240 (provided the owner inventory 250 includes at least as many scores 224 as there are musician folders 260 in the selected ensemble folder 240).

Additionally, the sheet music assignment process 300 may provide functionality to view an owner inventory 250 sorted by the ensemble folder 240 (and, in some embodiments the musician folder 260) that include scores 224 or parts 226 or compositions 220 from that owner inventory 250.

The sheet music distribution system 200 also provides functionality to recall scores 224 and parts 226 so that the recalled scores 224 and parts 226 can be assigned to a different musician folder 260 (in the same ensemble folder 240 or in a different ensemble folder 240) in the future. As shown below, the sheet music distribution system 200 provides functionality for the owner of the composition 220 to recall a score 224 or part 226 selected by the owner of the composition 220. Additionally, the sheet music distribution system 200 may provide functionality for the owner of the composition 220 to recall all of the scores 224 and parts 226 of a composition 220 selected by the owner of the composition 220. Additionally, the sheet music distribution system 200 may provide functionality for the owner of compositions 220 to recall all of the scores 224 and parts 226 of all compositions 220 that have been assigned to a selected musician folder 260 or a selected ensemble folder 240. When a score 224 or part 226 is recalled from a musician folder 260, the sheet music distribution system 200 no longer provides functionality for the musician with access to that musician folder 260 to view the recalled score 224 or part 226. Furthermore, the sheet music distribution system 200 makes the recalled score 224 or part 226 available to the owner of the composition 220 to assign to a different musician folder 260 (in the same ensemble folder 240 or in a different ensemble folder 240).

Figure 4:
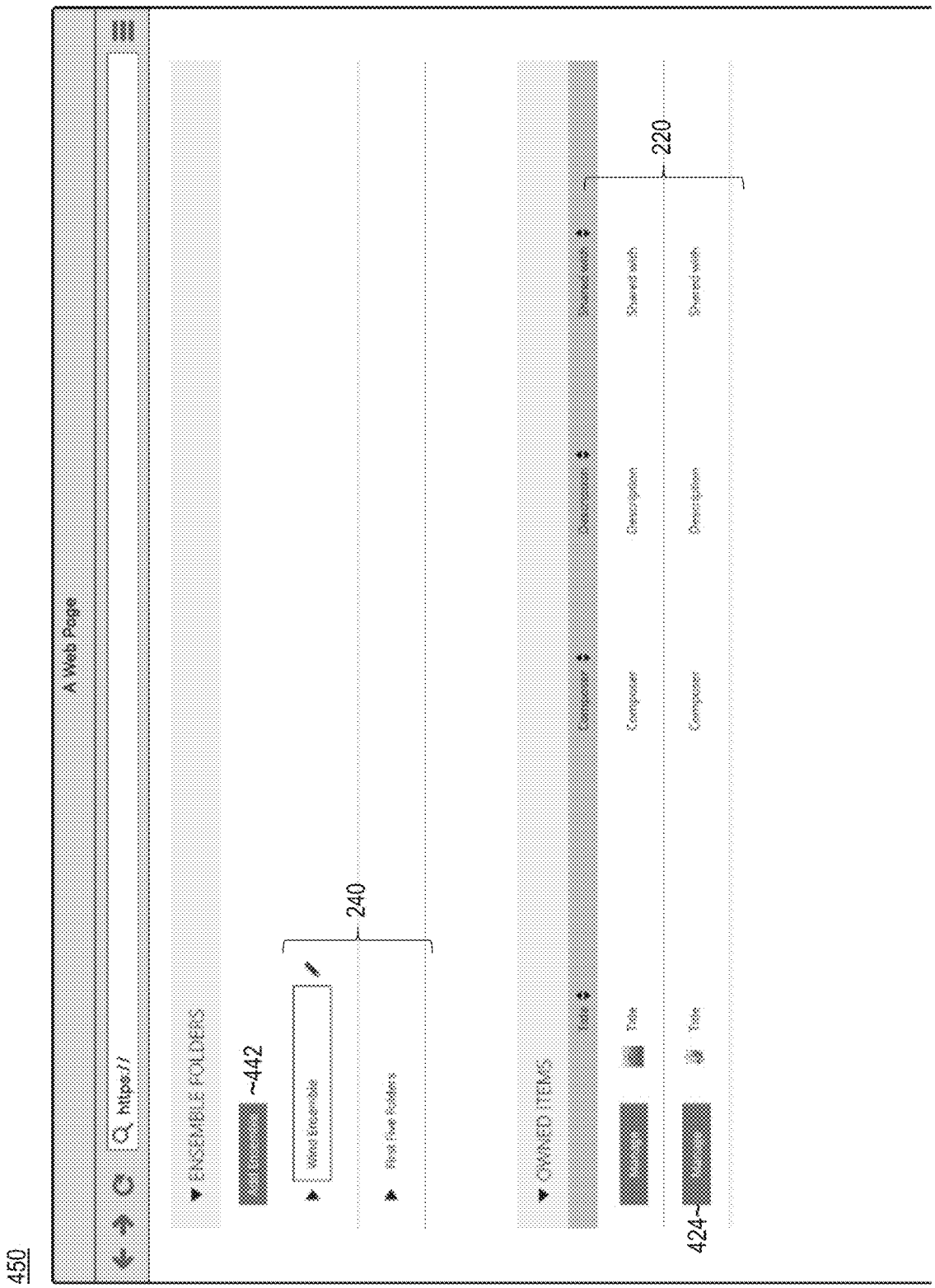
FIG. 4 illustrates an owner inventory view of a graphical user interface according to an exemplary embodiment.

FIG. 4 illustrates an owner inventory view 450 of the graphical user interface 290 according to an exemplary embodiment.

As shown in FIG. 4, the owner inventory view 450 displays each of the ensemble folders 240 and each of the compositions 220 in the owner inventory 250. The owner inventory view 450 includes functionality to add an additional ensemble folder 240, for example via an add ensemble folder button 442. The owner inventory view 450 also includes functionality to distribute the scores 224 and/or parts 226 of each composition 220, for example via the manage composition button 424.

Figure 5:
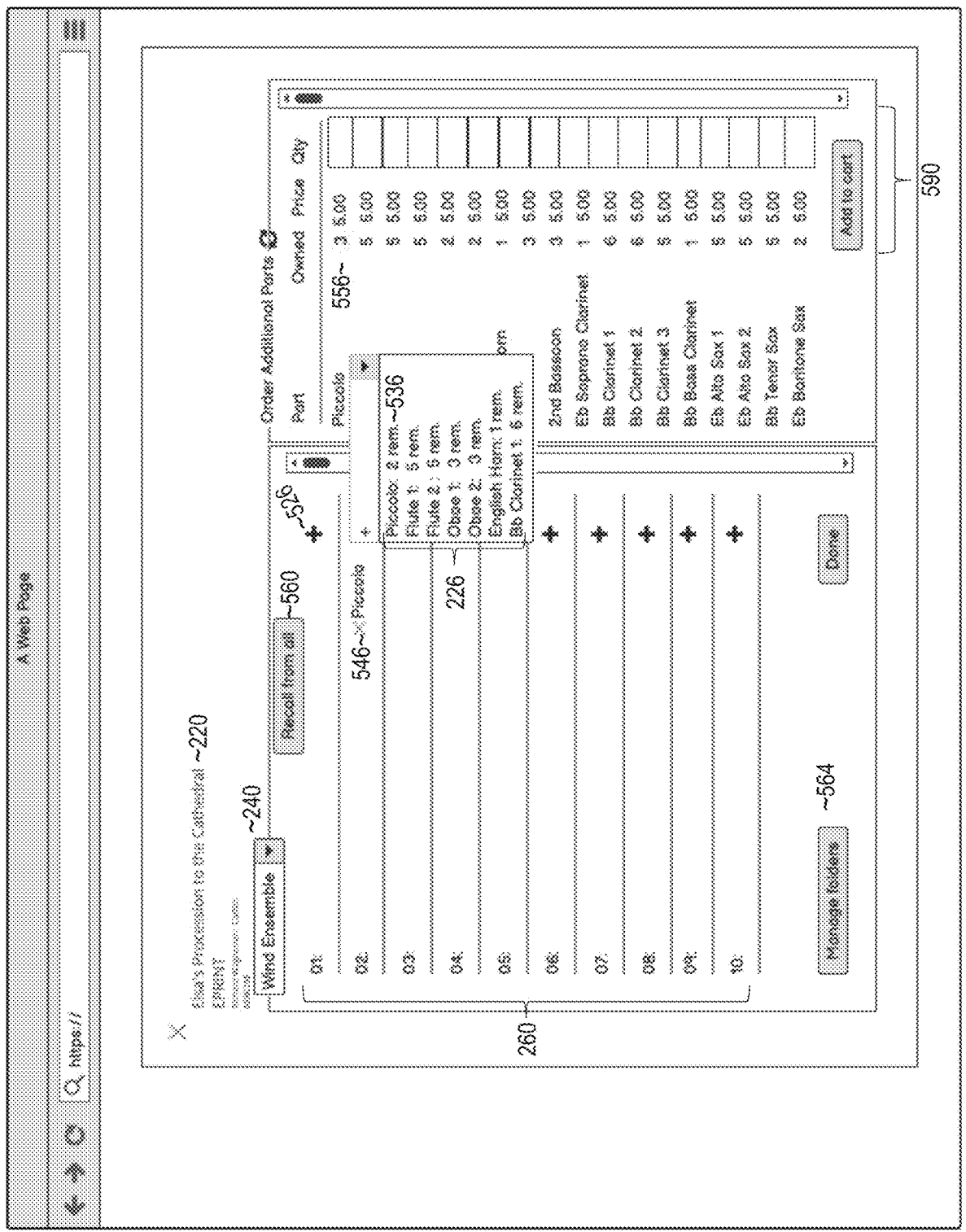
FIG. 5 illustrates a parts distribution view of the graphical user interface according to an exemplary embodiment.

FIG. 5 illustrates a parts distribution view 500 of the graphical user interface 290 according to an exemplary embodiment.

As shown in FIG. 5, the parts distribution view 500 includes functionality to distribute the parts 226 (or score 224) of a selected composition 220. The parts distribution view 500 enables each composition owner to select an ensemble folder 240 and view the musician folders 260. The parts distribution view 500 also enables the owner of the composition 220 to add musician folders 260 to the selected ensemble folder 240, for example via a manage musician folders button 564.

As shown in FIG. 5, the parts distribution view 500 provides functionality for the owner of the composition 220 to distribute parts 226 (or scores 224) to each musician in the ensemble, for example by selecting the add score/part button 526 and by placing each part 226 (or score 224) in each musician folder 260. The parts distribution view 500 provides functionality for the owner of the composition 220 to recall each part 226 (or score 224), for example via the recall part/score button 546, and may provide functionality to recall all of the parts 226 and scores 224 from the ensemble, for example via the recall all button 560. The parts distribution view 500 may display the number of parts 226 and scores 224 of the selected composition 220 included in the owner inventory 250 (e.g., the parts/scores purchased 556) and the number of parts 226 and scores 224 of the selected composition 220 that have yet to be distributed (e.g., the number of parts/scores remaining 536). Finally, the parts distribution view 500 may provide e-commerce functionality 590 to purchase additional parts 226 and scores 224, for example via the e-commerce platform 210.

Figure 6:
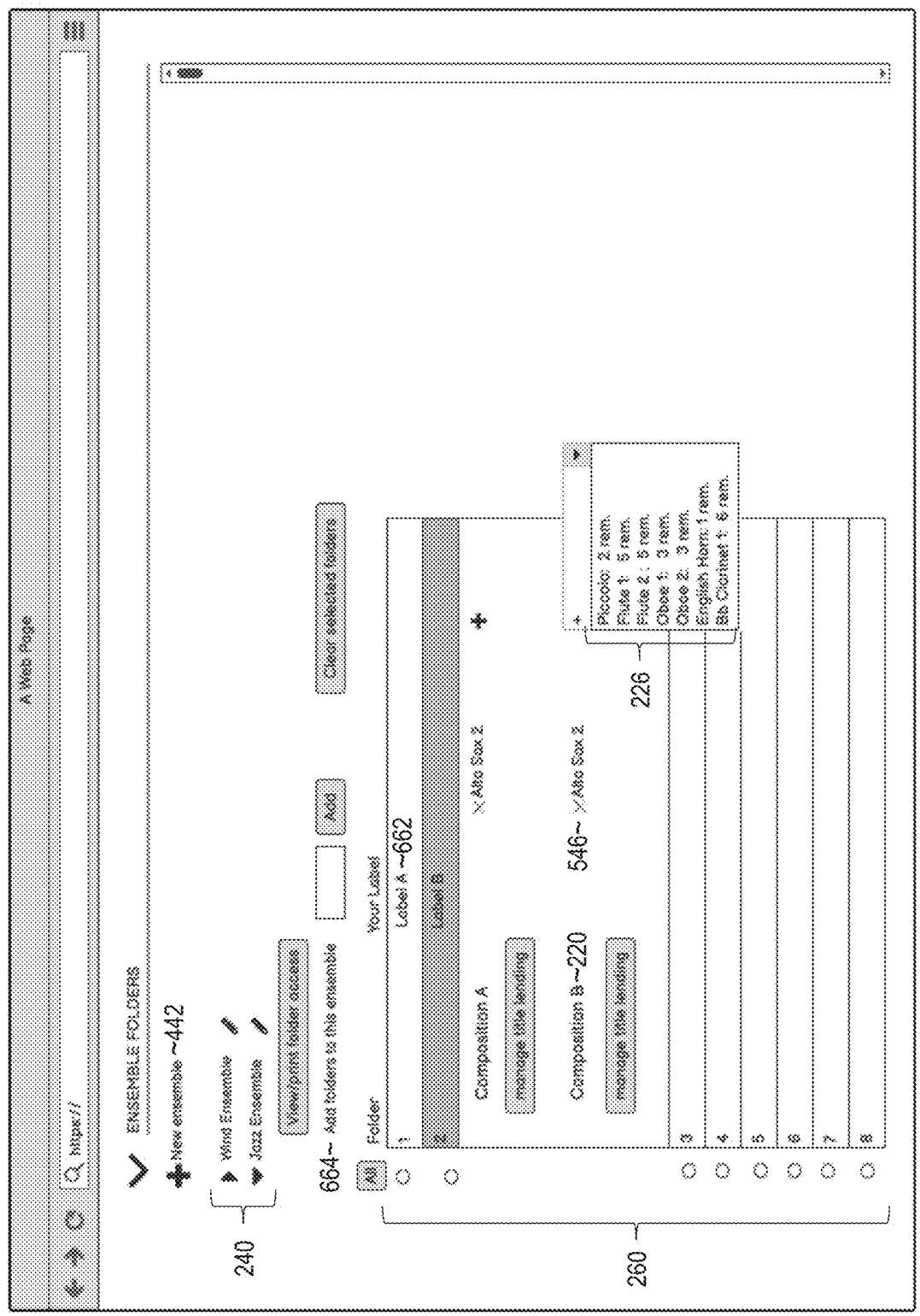
FIG. 6 illustrates a musician folders view of the graphical user interface according to an exemplary embodiment.

FIG. 6 illustrates a musician folders view 600 of the graphical user interface 290 according to an exemplary embodiment.

As shown in FIG. 6, the musician folders view 600 provides functionality to manage the parts 226 and scores 224 assigned to each musician folder 260 in each ensemble folder 240. The musician folders view 600 provides functionality to select an ensemble folder 240 and view all of the musician folders 260 included in the selected ensemble folder 240. The musician folders view 600 may also provide functionality to add an ensemble folder, for example via the add ensemble folder button 442, or add a musician folder 260 to a selected ensemble folder 240, for example via the add musician folder field 664. The musician folders view 600 provides functionality for a user to specify a label 662 for each musician folder 260. Accordingly, the composition owner may specify a label 662 identifying the musician or the musician's role (e.g., violin 1).

As shown in FIG. 6, the musician folders view 600 provides functionality to assign parts 226 (or scores 224) of each composition 220 in the owner inventory 250 to each of the musician folders 260 in the selected ensemble folder 240. The musician folders view 600 also provides functionality for the owner of the composition 220 to recall each part 226 (or score 224), for example via the recall part/score button 546.

Figure 7:
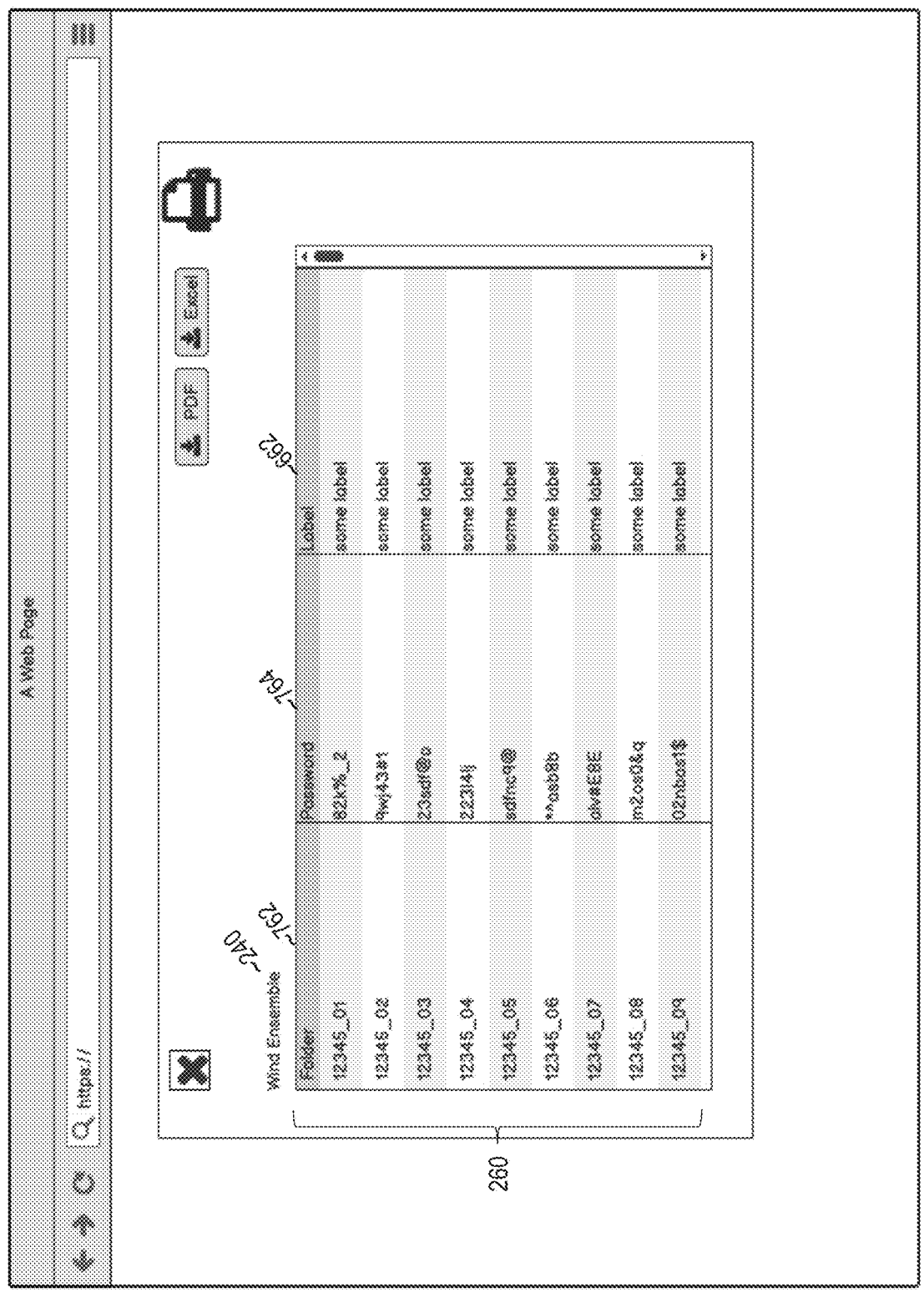
FIG. 7 illustrates a musician credentials view of the graphical user interface according to an exemplary embodiment.

FIG. 7 illustrates a musician credentials view 700 of the graphical user interface 290 according to an exemplary embodiment.

As shown in FIG. 7, the musician credentials view 700 may enable the user to view all of the musician folders 260 in an ensemble folder 240, including the folder name 762, password 764, and label 662. Accordingly, the owner of the composition 220 can provide the folder name 762 and the password 764 to the musician identified by the label 662 so that the musician can access the musician folder 260 using the sheet music distribution system 200 and view the scores 224 and/or parts 226 stored in the musician folder 260. Alternatively, instead of showing the password 764 to the owner of the composition 220, the sheet music distribution system 200 may provide functionality for the owner of the composition 220 to specify contact information for the identified musician (e.g., an email address) and may generate a password 764 and send it to the identified musician directly.

The sheet music distribution system 200 also provides functionality for a musician having access to a musician folder 260 to view the scores 244 and parts 226 assigned to that musician folder 260.

Figure 8:
FIG. 8 illustrates a login screen for musicians in an ensemble according to an exemplary embodiment.

FIG. 8 illustrates a login screen 800 of the graphical user interface 290 according to an exemplary embodiment.

As shown in FIG. 8, the login screen 800 enables a musician to enter the folder name 762 and the password 764 to access the musician folder 260 using the sheet music distribution system 200 and view the scores 224 and/or parts 226 stored in the musician folder 260.

Figure 9:
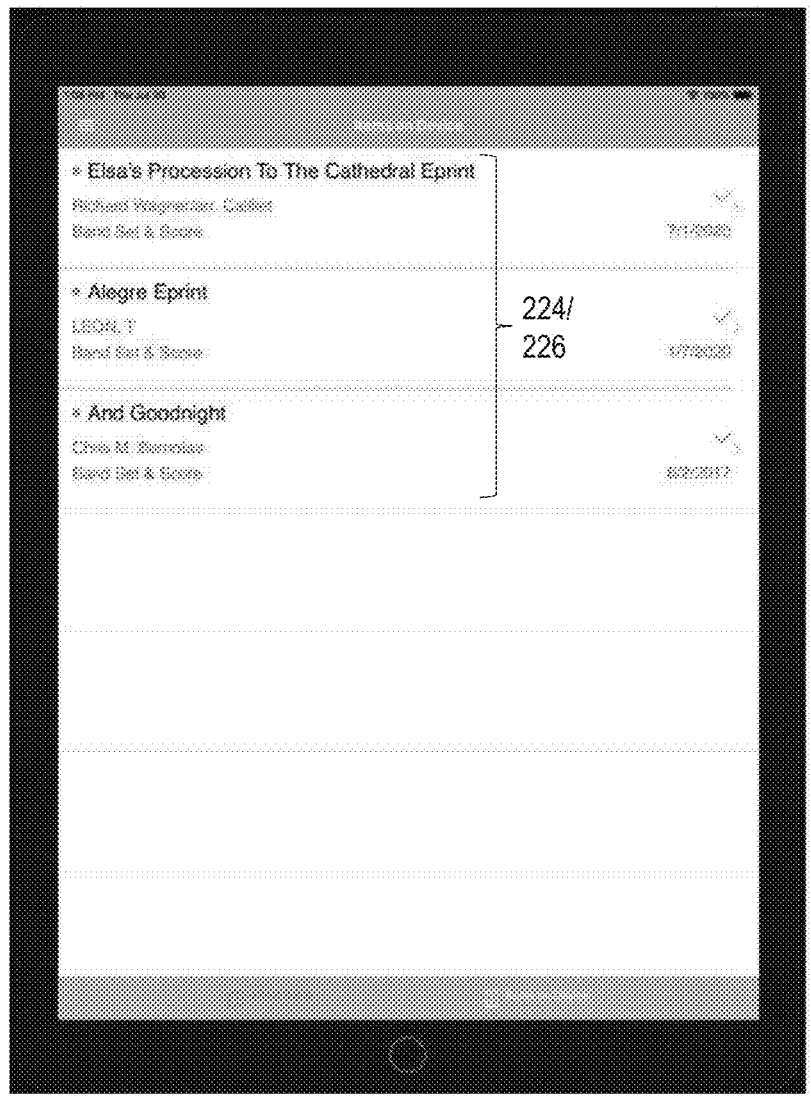
FIG. 9 illustrates a musician folder view of the graphical user interface according to an exemplary embodiment.

FIG. 9 illustrates a musician folder view 900 of the graphical user interface 290 according to an exemplary embodiment.

As shown in FIG. 9, the musician folder view 900 lists all of the scores 224 and/or parts 226 that have been added to the musician folder 260 and provides functionality for the musician to view those scores 224 and/or parts 226. To protect the copyrighted compositions 220, the network security module 230 may limit the number of simultaneous logins to each musician folder 260.

Figure 10:
FIG. 10 illustrates a composition view of the graphical user interface according to an exemplary embodiment.

FIG. 10 illustrates a composition view 1000 of the graphical user interface 290 according to an exemplary embodiment.

As shown in FIG. 10, the composition view 1000 enables the musician to view the score 224 or part 226 of the composition 220 that has been added to the musician folder 260 and selected by the musician. To protect the copyrighted score 224 or part 226, the graphical user interface 290 may not provide functionality to print the score 224 or part 226 or download the score or part to the remote computing device 190. Additional functionality, such as taking a screenshot, may also be disabled (e.g., on a remote computing device 190 running a mobile application).

Benefits of the Disclosed System

As described above, to share digital compositions 220, existing technology requires the owner of the composition 220 to print and scan scores 224 and parts 226 and share the scanned scores 224 and parts 226, for example using email or file sharing services. That method is a both cumbersome process for the owner of the composition 220 and does not protect the copyright of the scores 224 and parts 226 because it allows (and even requires) that unauthorized copies of the scores 224 and parts 226 be made.

In order to overcome the technical and other disadvantages of the prior art, the sheet music distribution system 200 provides functionality for a user to purchase compositions 220 from any remote computing device 120 with access to the one or more servers 180 and share any score 224 or part 226 included in that purchased composition 220 using the remote computing device 120. Meanwhile, the sheet music distribution system 200 provides functionality for a musician to view a shared score 224 or part 226 using any remote computing device 120 with access to the one or more servers 180. Finally, the sheet music distribution system 200 protects the copyright of the compositions 220 by preventing the owner of a composition 220 from sharing more copies of each score 224 or part 226 than the owner has purchased.

Variations on the Preferred Embodiments

This disclosure refers to ensemble folders 240 associated with ensembles (e.g., professional, amateur, and student ensembles). However, as one of ordinary skill in the art will recognize, the ensemble folders 240 may be used to distribute scores 224 or parts 226 to any (formal or informal) groups of musicians regardless of whether those musicians perform together. For example, a private teacher may use an ensemble folder 240 to distribute scores 224 or parts 226 to a group of musicians that may not necessarily play together.

The embodiments described above include ensemble folders 240 for the convenience of users with many musicians in many ensembles. In other embodiments, the sheet music distribution system 200 may provide functionality to assign scores 224 and parts 226 of compositions 220 to musician folders 260 that are not part of ensemble folders 240.

The embodiments described above provide functionality for the owner of a composition 220 to assign scores 224 and parts 226 of compositions 220 to musician folders 260 created by the owner of the composition 220. In other embodiments, musicians may create accounts (and, optionally, form a groups of accounts with the other members of an ensemble) and the sheet music distribution system 200 provides functionality for the owner of a composition 220 to assign scores 224 and parts 226 of compositions 220 in the owner inventory 250 to the account created by that musician (and recall any assigned score 224 or part 226). In those embodiments, the sheet music distribution system 200 provides functionality for a musician to maintain one login credential and receive and view scores 224 and parts 226 from multiple owners of multiple compositions 220.

While preferred embodiments have been set forth above, those skilled in the art who have reviewed the present disclosure will readily appreciate that other embodiments can be realized within the scope of the invention. Therefore, the present invention should be construed as limited only by any appended claims.

What is claimed is:

1. A system for distributing copyrighted sheet music via computer networks, the system comprising:
   non-transitory computer readable storage media that stores copyrighted sheet music;
   a network security module that that:
      provides login credentials for each of a plurality of purchasers and each of a plurality of musicians; and
      limits the number of simultaneous logins by each musician;
   an electronic commerce platform that provides functionality for purchasers to purchase copies of copyrighted sheet music; and
   a graphical user interface, provided by a server, that:
      provides functionality for each purchaser to distribute each purchased copy of copyrighted sheet music to one of the musicians without providing functionality to distribute a copy of copyrighted sheet music to more than one of the musicians;
      provides functionality for each musician to view each copy of copyrighted sheet music distributed to the musician via any computing device in network communication with the server; and
      provides functionality for purchasers to recall a copy of copyrighted sheet music distributed to a first musician and distribute the recalled copy of the copyrighted sheet music to a second musician without providing functionality for the first musician to view the recalled copy of the copyrighted sheet music.

2. A system for distributing copyrighted sheet music via computer networks, the system comprising:

non-transitory computer readable storage media that stores copyrighted sheet music;
a network security module that that provides login credentials for each of a plurality of purchasers and each of a plurality of musicians;
an electronic commerce platform that provides functionality for the purchasers to purchase copies of copyrighted sheet music; and
a graphical user interface, provided by a server, that:
provides functionality for each purchaser to create musician folders for distributing purchased copies of the copyrighted sheet music, the network security module requiring login credentials to access each of the musician folders;
provides functionality for each purchaser to distribute each purchased copy of copyrighted sheet music to one of the musicians by adding each purchased copy to one of the musician folders; and
provides functionality for each musician having the login credentials to access each of the musician folders to view each purchased copy of copyrighted sheet music added to the musician folder via any remote computing device in network communication with the server.

3. The system of claim 2, wherein the system does not provide functionality for a purchaser to distribute a copy of copyrighted sheet music to more than one musician.

4. The system of claim 2, wherein the network security module limits the number of simultaneous logins by each musician.

5. The system of claim 2, wherein the graphical user interface provides functionality for the purchasers to recall a copy of copyrighted sheet music distributed to a first musician and distribute the recalled copy of the copyrighted sheet music to a second musician.

6. The system of claim 5, wherein the graphical user interface does not provide functionality for the first musician to view the recalled copy of the copyrighted sheet music.

7. The system of claim 2, wherein the graphical user interface provides the functionality for the musicians to view the copyrighted sheet music via a computing device that is remote from the server.

8. The system of claim 2, wherein the network security module limits the number of remote computing devices that can simultaneously access each musician folder.

9. A computer implemented method for distributing copyrighted sheet music via computer networks, the method comprising:
storing copyrighted sheet music in non-transitory computer readable storage media;
providing login credentials, by a server, to each of a plurality of purchasers and each of a plurality of musicians;
providing functionality, by the server, for purchasers to purchase copies of copyrighted sheet music;
providing functionality, by the server, for purchasers to create musician folders for distributing purchased copies of the copyrighted sheet music;
requiring login credentials, by the server, to access each of the created musician folders;
providing functionality, by the server, for each purchaser to distribute each purchased copy of copyrighted sheet music to one of the musicians by adding each purchased copy to one of the musician folders; and
providing functionality, by the server, for each of the musicians having the login credentials to access each of the musician folders to view each copy of copyrighted sheet music added to the musician folder via any remote computing device in network communication with the server.

10. The method of claim 9, wherein the server does not provide functionality for a purchaser to distribute a copy of copyrighted sheet music to more than one musician.

11. The method of claim 9, further comprising:
limiting the number of simultaneous logins by each musician.

12. The method of claim 9, further comprising:
providing functionality for the purchasers to recall a copy of copyrighted sheet music distributed to a first musician and distribute the recalled copy of the copyrighted sheet music to a second musician.

13. The method of claim 12, wherein the server does not provide functionality for the first musician to view the recalled copy of the copyrighted sheet music.

14. The method of claim 9, wherein the functionality for the musicians to view the copyrighted sheet music comprises functionality for the musicians to view the copyrighted sheet music via a computing device that is remote from the server.

15. The system of claim 9, wherein functionality for the purchasers to distribute purchased copies comprises functionality for the purchasers to create musician folders and add each purchased copy to one of the musician folders.

16. The method of claim 9, further comprising:
limiting the number of remote computing devices that can simultaneously access each musician folder.

17. A system for distributing copyrighted sheet music via computer networks, the system comprising:
non-transitory computer readable storage media that stores copyrighted sheet music;
a network security module that:
provides login credentials for each of a plurality of purchasers and each of a plurality of musicians, each musician belonging to one or more ensembles; and
limits the number of simultaneous logins by each musician;
an electronic commerce platform that provides functionality for purchasers to purchase copies of copyrighted sheet music; and
a server that:
provides functionality to distribute each purchased copy of copyrighted sheet music to one of the ensembles while preventing more than one musician viewing any individual purchased copy of the copyrighted sheet music;
provides functionality for musicians in each ensemble to view each copy of copyrighted sheet music distributed to the ensemble via any computing device in network communication with the server; and
provides functionality to recall a copy of copyrighted sheet music distributed to a first ensemble and distribute the recalled copy of the copyrighted sheet music to a second ensemble without providing functionality for musicians in the first ensemble to view the recalled copy of the copyrighted sheet music.

* * * * *